Patented June 18, 1940

2,205,308

UNITED STATES PATENT OFFICE 2,205,308

ELECTRICAL RESISTOR

Marcello Pirani, Wembley, England, assignor to General Electric Company, a corporation of New York No Drawing. Application July 26, 1938, Serial No. 221,397. In Great Britain July 26, 1937

3 Claims. (Cl. 201—76)

This invention relates to electrical resistors, especially to resistors having a resistivity between 10 and 10,000 ohms per centimeter cube, and to a method of making the same. The invention is concerned more particularly with resistors having a resistivity within the range of 100 to 1,000 ohms per centimeter cube. Such resistors usually have a total resistance between a thousand and a few million ohms and are useful, among other applications, for regulating currents in electric discharge devices.

The object of the invention is to provide electrical resistance units which are easily manufactured and adjusted to a prescribed value, are mechanically strong, and are particularly suitable for embodiment in discharge devices. In the manufacture of such devices it is important that the resistor withstand heating in a vacuum to the temperature to which a glass envelope is usually baked during evacuation. Resistors of this invention meet this requirement.

Carbon associated with a non-conducting material is often used in making resistors having a resistance of 10,000 ohms and upwards. For example, carbon in the form of graphite is often coated on a non-conducting core or dispersed through a mass of partially carbonized organic material. The method of manufacture according to the invention resembles the second rather than the first of these methods, but differs from it in that the non-conducting medium in which the carbon is dispersed is not mainly, or at all, that from which the carbon is derived. Further, in practicing this invention the organic binder component of the raw mix is converted in large part to free carbon by carrying out the carbonization or firing step at a higher temperature than heretofore has been used. Consequently the electrical properties of the resulting carbon are generally different. Because higher tempratures are used in making the resistors, the finished article is more resistant to high temperatures and will withstand baking at 500° C. in a vacuum. This is a most important property when the resistor is to form a part of an electric discharge device.

According to the invention an electrical resistor having, for example, a resistivity between 10 and 10,000 ohms per centimeter cube, is manufactured by heating in a non-oxidizing atmosphere to a temperature not less than 1200° C. a mixture of finely divided, solid inorganic substance and an organic binder that can be carbonized by heat. The nature of the solid material and the temperature of heating are such that the particles of the solid material sinter together to form a sintered ceramic mass in which free carbon is dispersed.

The lower limit of 1200° C. is imposed in order that a carbon of the desired heat-resisting and other physical characteristics will be obtained. A somewhat high temperature generally is required to secure sintering of the solid material into the form of a ceramic mass or body. However, no advantage is known in using a material which will not sinter at 1600° C. On the other hand, temperatures exceeding substantially 1800° C. are to be avoided because of the greater possibility that an excessive amount of carbon will be removed when the mass is heated above 1800° C. This is particularly true when the non-oxidizing atmosphere is hydrogen. Even when the hydrogen is carefully dried some water vapor is usually present as an impurity, resulting in the relatively rapid removal of carbon when the firing step is carried out at a maximum temperature of 1800° C.

One suitable solid inorganic material especially adapted for use in practicing this invention is a mixture of silicon carbide, SiC (also known under the trade name of "Carborundum"), and aluminum silicate or other suitable inorganic binder, with which may be associated other ingredients. Silicon carbide particles alone will not sinter to a ceramic mass. A bonding agent, preferably a siliceous binder such as a silicate, is therefore incorporated into the mass to hold the silicon carbide particles together. It is advantageous to use a binder having a coefficient of thermal expansion approximating that of silicon carbide, which has a thermal expansion coefficient of about $6 \times 10^{-6}$ per degree C. The resulting mass is then strong and is better adapted to withstand thermal shock. Sillimanite, consisting essentially of aluminum silicate and developing a liquid phase at 1500° to 1600° C., is suitable. So also, are aluminum silicate glasses of the kind in which the ratio of alumina to silica lies between 1 and 2.5 and in which the alumina and silica together constitute at least 88 per cent of the glass; the remainder may be made up of magnesia, thoria and beryllia. A suitable composition is formed, in per cent by weight, of alumina 45, silica 45, magnesia 4, thoria 4 and beryllia 2. The coefficient of expansion of sillimanite over the range 15° C. to 800° C. is about $5 \times 10^{-6}$; that of the said aluminum silicate glasses, between 5 and $6 \times 10^{-6}$.

A suitable organic binder is, for instance, starch solution or synthetic resin varnishes such, for example, as an alkyd resin varnish.

In one method of manufacturing a resistor according to the invention, described by way of example, 75 parts by weight of silicon carbide particles, preferably with a grain size not exceeding 100 microns, are mixed with 25 parts by weight of finely ground sillimanite, aluminum silicate glass or a batch from which the said glass may be prepared, and with sufficient starch solution, alkyd resin varnish or other organic binder to render the mass plastic. The resulting body is fired at 1200° to 1800° C. in commercially dried hydrogen for a period of 5 to 30 minutes, depending on the thickness of the body.

Another suitable solid material is partially hydrated, very finely divided silica of the kind commonly known as precipitated silica. This may be used in lieu of all or a part of either, or both, the silicon carbide and siliceous binder of the composition described above. Precipitated silica can be sintered together, without any added inorganic binder, to form a ceramic mass. Hence a mixture of such silica and organic binder can be used to form the electrical resistors of this invention. On the other hand, finely ground quartz or quartz glass requires the use of an inorganic bonding agent; for even though such a substance will sinter together at 1600° C., the resulting structure is excessively porous and the carbon resulting from the decomposition under heat of the organic binder then tends to be removed almost as rapidly as it is formed.

When precipitated silica is utilized in practicing this invention, a resistor may be made by mixing such silica with enough starch paste, alkyd resin varnish or other organic binder to form a moldable mass, after which the mass is heated to decompose the said binder and to form a ceramic mass having carbon particles uniformly dispersed therethrough. For example, rods 2 millimeters in diameter may be formed by extruding the plastic mass. Thereafter the extruded rods are heated in dry hydrogen or other suitable non-oxidizing gas at a temperature of, for example, about 1500° to 1550° C. The resulting product is hard, black, and has a resistance which may vary, for instance, between 5,000 and 50,000 ohms per centimeter.

Resistors produced as described above have certain common properties. If they are heated in air to 800° C. for a sufficient period (10 minutes is sufficient when the resistor is in the form of a rod 2 millimeters in diameter), their resistance increases very greatly. If tested at small voltages, such a resistor shows a resistivity greater than $10^6$ ohms per centimeter cube, and may be practically infinite. The increase in resistivity results from the burning of a part of the dispersed carbon, leaving the sintered ceramic mass. If the resistor is heated in wet hydrogen instead of in air, the increase in resistance proceeds more slowly and controllably. It is therefore possible to produce a resistor of a desired resistance by making it originally of a lower resistance and then heating it in wet hydrogen to increase its resistance.

The conductance of the resistor is similar to that of "flashed carbon" obtained by the known method of heating a ceramic body to a temperature of 1200° to 1800° C. in vapors of saturated chain hydrocarbons. The temperature coefficient of the resistance lies between $-3\times10^{-4}$ and $-1\times10^{-4}$ per degree C. It is therefore probable that the conducting material dispersed in the ceramic mass is similar in constitution to such flashed carbon.

The effect of varying the binder and the temperature of heating can be ascertained by analogy with the said process of producing flashed carbon. A temperature change produces the same result in both cases. For example, an increase in temperature moves the temperature coefficient of resistance toward zero. Low carbon content of the binder corresponds to low concentration of the hydrocarbon vapor. Starch solution has a low carbon content relative to alkyd resin varnish as ordinarily supplied; the carbon content of the latter can be reduced by dilution, but then its binding properties suffer.

It is to be observed that silicon carbide crystals are known to be semi-conductors the resistivity of which is less than $10^6$ ohms per centimeter cube with a temperature coefficient of $-5\times10^{-4}$ per degree C. The facts stated above show that when a mixture of silicon carbide and siliceous bonding agent is used as the solid material, the conductance of the resistor is due little, if any, to the conducting properties of the silicon carbide particles which at least at low voltages, appear to be insulated from each other. If, however, a voltage of 10,000 or more is applied after the resistor has been oxidized, an appreciable conductance appears. This behavior is not shared by resistors made with precipitated or other silica; after oxidation of such resistors the silica remains non-conducting under all voltages.

When the solid material is a mixture of silicon carbide and a bonding agent having nearly the same expansion coefficient, the conductivity can be increased by adding metallic powder, advantageously one having approximately the same expansion coefficient as silicon carbide. Preferably, above 10 per cent metallic powder is added. If less than 10 per cent be used, the conductance of the resistor is not materially increased because the individual particles are, generally, separated from each other. The amount of metallic powder advantageously may be from 40 to 50 per cent by weight of the total amount of finely divided solids in the raw mix from which the article is made. In such a case the conductivity is due chiefly to the metallic powder. A more specific example is a product made from a mixture of, by weight, 90 parts molybdenum powder, 75 parts finely divided silicon carbide and 25 parts siliceous bonding agent. This mixture is processed as described with reference to the first example. Articles containing metallic powders are not resistors as such term is commonly understood in the art; but they may be used conveniently as lead-in conducting elements to resistors made as herein described. Such conducting elements are prepared at the same time as the resistor and form an integral part of it.

As indicated in the statement of the object of the invention, resistors produced in accordance with this invention are highly suitable for use in connection with electric discharge devices; for they can be inserted in the envelope before it is baked and evacuated. They can serve as stabilizing impedances or as resistors connecting an auxiliary starting electrode to a main electrode. But they also may be placed outside the envelope, for example in the cap.

What I claim as new and desire to secure by Letters Patent of the United States is:

1. The method of making an electrical resistor which comprises preparing a mixture of silicon carbide, an inorganic siliceous binder and an organic binder, shaping the resulting mass, and firing the shaped mass within a temperature range of 1200° to 1800° C. in a non-oxidizing atmosphere to decompose the organic binder and to form a mechanically strong ceramic mass having carbon particles dispersed therethrough.

2. The method of making an electrical resistor which comprises preparing a mixture comprising silicon carbide, a siliceous binder and an organic binder, shaping the resulting mass, firing the shaped mass in a non-oxidizing atmosphere within a temperature range of 1200° to 1800° C. to decompose the organic binder and to form a ceramic mass having carbon particles dispersed therethrough, and further firing the thus formed ceramic mass in an atmosphere of wet hydrogen to remove some, but not all, the dispersed carbon and thereby to increase the resistance of the resistor.

3. The method of making an electrical resistor which comprises preparing a mixture of silicon carbide, an aluminum silicate glass in which the ratio between alumina and silica lies between 1 and 2.5, and an organic binder, shaping the resulting mass, and sintering the shaped mass within a temperature range of 1200° to 1800° C. in the presence of a non-oxidizing atmosphere to carbonize the organic binder and to form a strong ceramic mass containing carbon particles dispersed throughout the ceramic mass.

MARCELLO PIRANI.